United States Patent
Chasse et al.

(10) Patent No.: US 9,286,737 B2
(45) Date of Patent: Mar. 15, 2016

(54) METHOD OF DETERMINING AN ECO-DRIVING INDICATOR FOR THE TRAVEL OF A VEHICLE

(71) Applicant: IFP Energies nouvelles, Rueil-Malmaison Cedex (FR)

(72) Inventors: Alexandre Chasse, Paris (FR); Wissam Dib, Suresnes (FR); Domenico Di Domenico, Lyons (FR); Philippe Moulin, Paris (FR); Antonio Sciarretta, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 68 days.

(21) Appl. No.: 13/966,355

(22) Filed: Aug. 14, 2013

(65) Prior Publication Data
US 2014/0067247 A1 Mar. 6, 2014

(30) Foreign Application Priority Data

Aug. 31, 2012 (FR) ...................................... 12 02351

(51) Int. Cl.
*G07C 5/02* (2006.01)
*G07C 5/08* (2006.01)
(Continued)

(52) U.S. Cl.
CPC ............... *G07C 5/08* (2013.01); *B60L 15/2009* (2013.01); *B60L 15/2045* (2013.01); *B60W 20/00* (2013.01); *B60W 20/10* (2013.01); *B60W 20/104* (2013.01); *B60L 2200/26* (2013.01); *B60L 2240/60* (2013.01); *B60L 2240/62* (2013.01); *B60L 2240/64* (2013.01); *B60L 2240/68* (2013.01); *B60L 2260/54* (2013.01); *B60W 2050/0078* (2013.01); *B60W 2050/0089* (2013.01); *B60W 2050/046* (2013.01); *B60W 2050/146* (2013.01); *B60W 2530/14* (2013.01); *B60W 2550/143* (2013.01);
(Continued)

(58) Field of Classification Search
CPC ........ G07C 5/08; G07C 5/0816; B60L 15/20; B60L 15/2045; B60L 2240/12
See application file for complete search history.

(56) References Cited

U.S. PATENT DOCUMENTS 8,793,064 B2 * 7/2014 Green ................... B60W 40/09
340/438
8,812,352 B2 * 8/2014 Boss ...................... G06Q 30/02
705/1.1

(Continued)

FOREIGN PATENT DOCUMENTS

DE  199 01 532 A1  7/2000
EP  1 973 078 A1  9/2008
(Continued)

*Primary Examiner* — Jonathan M Dager
(74) *Attorney, Agent, or Firm* — Fitch, Even, Tabin & Flannery LLP

(57) ABSTRACT

The invention relates to a method of determining at least one eco-driving indicator wherein at least a first indicator (IND) is determined as an optimal speed ($V_{opt}$) that minimizes the energy consumption. Calculation of optimal speed $V_{opt}$ is constrained by measured instant speeds $V_{mes}$ at breakpoints of the travel where the driver has to adapt his driving according to conditions external to the travel. Once the eco-driving indicator is determined, it can be displayed (AFF) and/or the vehicle can be controlled (COM) in accordance with the indicator.

39 Claims, 2 Drawing Sheets

(51) Int. Cl.
  *B60L 15/20* (2006.01)
  *B60W 20/00* (2006.01)
  *B60W 50/00* (2006.01)
  *B60W 50/04* (2006.01)
  *B60W 50/14* (2012.01)

(52) U.S. Cl.
  CPC . *B60W 2550/402* (2013.01); *F02D 2200/0625* (2013.01); *Y02T 10/7275* (2013.01); *Y02T 10/7291* (2013.01); *Y02T 90/16* (2013.01); *Y02T 90/162* (2013.01)

(56) References Cited

U.S. PATENT DOCUMENTS

| | | | | |
|---|---|---|---|---|
| 9,014,876 | B2* | 4/2015 | Mason | G07C 5/0816 701/2 |
| 2005/0131597 | A1* | 6/2005 | Raz | G09B 19/167 701/29.1 |
| 2009/0222338 | A1* | 9/2009 | Hamilton, II | G06Q 30/02 705/14.1 |
| 2009/0318121 | A1* | 12/2009 | Marumoto | G07C 5/085 455/414.1 |
| 2010/0047744 | A1* | 2/2010 | Miura | B60W 40/09 434/66 |
| 2010/0049400 | A1* | 2/2010 | Duraiswamy et al. | 701/35 |
| 2011/0313647 | A1* | 12/2011 | Koebler et al. | 701/123 |
| 2012/0221170 | A1* | 8/2012 | Tanoue | G09B 19/167 701/1 |

FOREIGN PATENT DOCUMENTS

| | | |
|---|---|---|
| EP | 2 147 285 | 11/2008 |
| EP | 2 166 309 A2 | 3/2010 |
| EP | 2 311 683 A1 | 4/2011 |
| KR | 10-0520941 | 5/2005 |

* cited by examiner

METHOD OF DETERMINING AN ECO-DRIVING INDICATOR FOR THE TRAVEL OF A VEHICLE

CROSS REFERENCE TO RELATED APPLICATION

Reference is made to French Patent Application Serial No. 12/02.351, filed on Aug. 31, 2012, which application is incorporated herein by reference in its entirety.

BACKGROUND OF THE INVENTION

1. Field of the Invention

The present invention relates to vehicles and more particularly, vehicle control directed to eco-driving.

2. Description of the Prior Art

In order to reduce the emissions and the energy consumption of vehicles, car manufacturers develop more environmentally friendly vehicles, notably electric vehicles, hybrid vehicles, or thermal engine sizing. However, it is also possible to limit the energy consumption and the emissions by reducing vehicle users to more ecological driving, also referred to as eco-driving. Eco-driving is a general term that designates improved energy-efficient driving, that is optimization of the energy required for completing a trip in a given time interval.

In order to notify a driver of the quality of driving, a first solution developed is informing the driver about instantaneous fuel consumption. Patent applications DE-19,901,532 A and KR-100,520,941 B1 disclose methods of calculating the momentary fuel consumption. Similarly, other improvements involve information given to the driver about momentary or cumulative emissions. For example, patent application EP-2,166,309 A illustrates this type of technique. These two data (consumption, emissions), alone or combined, do not enable knowing if driving can be optimized from an ecological point of view. Indeed, the driver cannot compare the data displayed with values that would correspond to an eco-driving.

To overcome this problem, patent application EP-1,973,078 A1 describes an energy consumption determination method that compares the current energy consumption for a given trip with a previous energy consumption recorded for the same trip. To compare the data, this method requires the existence of previous trips and a record of this information. Therefore, the driver cannot be informed about the ecological character of driving for a trip that has not been traveled. Furthermore, this method does not allow external driving constraints (road signs, traffic, etc.) to be taken into account. In fact, if the previous trip was recorded under ideal traffic conditions (for example without traffic stops), and if the current traffic conditions are less good, the information given to the driver is not representative of the ecological character of driving under the current external conditions.

Other developments relate to the calculation of an ideal energy consumption, so to provide a point of reference for comparison with the real consumption. Patent application EP-2,147,285 A1 describes a method implementing such a comparison. For this method, a signal is generated when the energy consumption is different from the ideal consumption. However, this method involves the same drawback as the aforementioned method. It does not allow the external driving conditions to be taken into account.

Patent application EP-2,311,683 A1 describes another method allowing the driver to know whether his or her driving can be referred to as eco-driving. This method can be used for a hybrid vehicle. For this method, one determines whether the driving parameters are in an ecological zone, a hybrid ecological zone or a non-ecological zone. Considering the limitation to these three zones only, it is not possible to precisely quantify the driving. Furthermore, these zones are defined by predetermined thresholds and it is therefore not possible to take the external driving conditions into account.

SUMMARY OF THE INVENTION

The invention relates to a method of determining at least one ecological driving indicator wherein at least a first indicator is determined as an optimal speed that minimizes the energy consumption. Calculation of the optimal speed is constrained by speeds measured at breakpoints of the travel where the driver has to adapt his or her driving according to conditions external to the travel.

The invention relates to a method of determining at least one eco-driving indicator of the travel of a vehicle corresponding to motion of the vehicle between two successive stops of the vehicle. This method comprises the following stages:

a) measuring an instantaneous speed of the vehicle during the travel;

b) identifying at least one breakpoint of the travel where the instant speed has been modified according to conditions external to the travel;

c) decomposing the travel into at least one segment with each segment being defined between two successive breakpoints and determining for each segment a distance and an average speed of the segment using the measured instant speed; and d) determining, as the first eco-driving indicator, an optimal speed of the travel, the optimal speed being calculated for each segment by an optimization algorithm that determines a speed minimizing energy consumption of the vehicle with the algorithm being constrained by the instant speeds at the breakpoints, the distance and by the average speed of the segment.

According to the invention, the driving of the vehicle is adapted in accordance with the eco-driving indicator.

Preferably, at least one breakpoint is identified by determining at least one slowing down of the vehicle from the measured instant speed and/or a reversal point of the instant speed of the vehicle and/or a stop of the vehicle and/or by determining a road sign and/or a traffic condition and/or a road configuration that require adapting the speed of the vehicle.

Alternatively, a next breakpoint is identified using maps and statistics relative to previous trips or to a road sign and/or a traffic condition and/or a road configuration.

Furthermore, the breakpoint is identified by a geolocation device of the vehicle and/or according to the condition of the barking system of the vehicle.

Preferably, the optimization algorithm is a dynamic programming algorithm implemented by a program executed on a programmed computer or a Hamiltonian method.

The optimization algorithm is preferably constrained by the maximum allowable speed.

According to the invention, a second eco-driving indicator can be determined by carrying out the following stages:

e) calculating an optimal energy as a function of the optimal speed by a propulsion model of the vehicle that relates the energy consumed by the vehicle to the speed of the vehicle; and f) determining the second eco-driving indicator by the optimal energy and of the energy consumed during the travel with the consumed energy being measured or calculated from the measured speed and the vehicle propulsion model.

Advantageously, the second eco-driving indicator is calculated during the travel.

Moreover, the second indicator can be a mark proportional to the ratio of the optimal energy to the consumed energy.

According to an embodiment of the invention, the vehicle propulsion model is_implemented by a program executed on a programmed computer is constructed from the equation on the longitudinal axis of the vehicle of the fundamental principle of dynamics applied to the vehicle with the model depending on the powertrain, the transmission, the dimensions of the wheels and the mass of the vehicle.

Advantageously, the vehicle is an electric motor vehicle powered by a battery with the consumed energy depending on the state of charge of the battery.

According to an embodiment of the invention, the at least one eco-driving indicator is displayed at the end of each travel.

Preferably, the at least one indicator is displayed on the dashboard of the vehicle, on a website or a stand-alone portable device such as a geolocation device or a mobile phone.

Advantageously, the second eco-driving indicator is a vehicle acceleration and/or deceleration tip.

According to an embodiment of the invention, stages a) to d) are repeated for several travels forming a trip and the at least one eco-driving indicator is determined for the trip.

The invention also relates to a vehicle control method. This method comprises the following stages:

i) determining at least one eco-driving indicator as described above; and ii) adapting the driving of the vehicle according to said eco-driving indicator.

In addition, the invention relates to a computer program product downloadable from a communication network and/or recorded on a computer readable medium and/or processor executable, comprising program code instructions for implementing the method as described above when the program is executed on a computer.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

The method according to the invention allows determination of at least one eco-driving indicator representative of an ecological driving behavior during the travel of a vehicle. This indicator can then be used for controlling the vehicle, by either informing the driver so that he or she can adapt his or her driving or by controlling the vehicle powertrain.

What is referred to as an eco-driving indicator is an indicator giving information on the ecological character of the driving behavior during the travel of the vehicle, that is on the energy consumed by the vehicle. It can represent a comparison between the energy consumed by the vehicle and a minimum energy required to move the vehicle.

Figure 3:
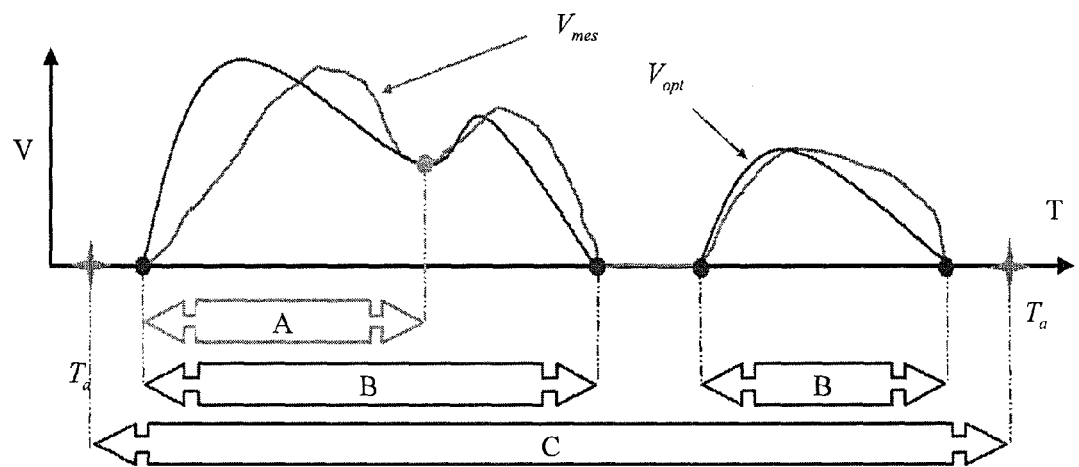
FIG. 3 illustrates the measured and optimal speeds of a travel as a function of time.
Figure 4:
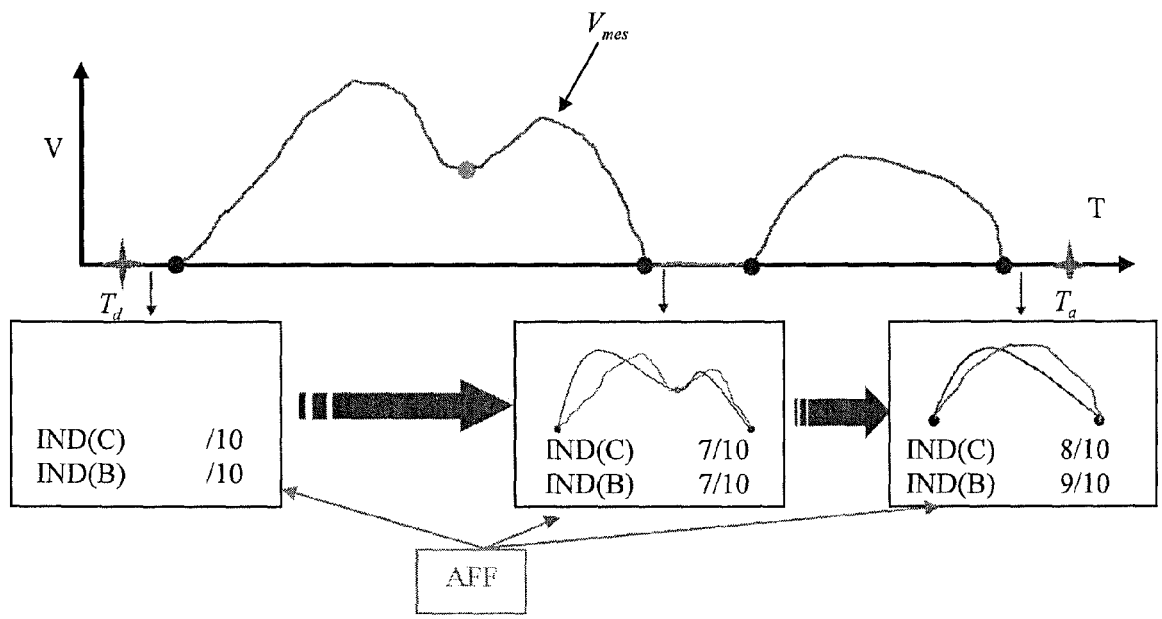
FIG. 4 illustrates the indicators and data displayed for the same travel according to an embodiment of the invention.

A trip is defined as the time spent by the driver on board the vehicle and it is divided into different phases for determining the indicator. FIG. 3 shows, among other things, the various phases of a trip:

Trip (C) is the Phase of presence of the driver on board the vehicle. This phase starts with the vehicle start-up ($T_d$) and ends with the final vehicle stop and the driver's exit from the vehicle ($T_a$). A trip can have multiple travels.

Travel (B) is the Phase of motion of the vehicle between two consecutive vehicle stops. A travel can comprise multiple segments.

Segment (A) is the Phase of motion of the vehicle between two breakpoints, whose speeds can be greater than or equal to zero. These breakpoints define travel constraints. For these breakpoints, the driver has to go through this geographical position with a particular speed for road sign reasons (priority to the right, bend, traffic lights, etc.), traffic reasons (traffic jam, braking of the vehicle in front, pedestrian crossing, etc.) or geographical considerations (bend, difference in height, etc.). The speeds associated with these breakpoints can be:

either a zero speed if the vehicle stops or accelerates after stopping, or a non-zero speed if the driver has to decelerate or accelerate for a reason linked with a road sign or the traffic. In the example illustrated in FIG. 3, the breakpoint at the end of segment (A) corresponds to a deceleration of the vehicle.

Figure 1:
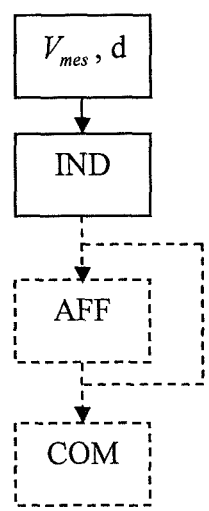
FIG. 1 illustrates the stages of the method according to the invention.

The method according to the invention is shown in FIG. 1. According to the invention, the method comprises the following stages:

1) measuring the speed and determining the distance ($V_{mes}$, d), 2) determining at least one eco-driving indicator (IND).

Furthermore, the method according to the invention can comprise the optional independent stages as follows:

3) indicator display (AFF), and 4) vehicle control (COM).

An operation that can be performed prior to these stages determines the state of the vehicle, that is if it is started, stationary, driving, etc. The speed of the vehicle and the state of the vehicle brakes can therefore be analyzed. It is thus possible to determine if the vehicle is stationary and if it is the end of a trip or of a travel. The following stages are then carried out only if the vehicle is started.

Stage 1) Measuring the Speed and Determining the Distance ($V_{mes}$, d)

The instant speed of the vehicle and the distance traveled are used to determine the eco-driving indicator of a travel. The instant speed of the vehicle $V_{mes}$ is therefore conventionally measured as a function of time and this speed is recorded.

From measured speed $V_{mes}$, the distance d covered over the travel is calculated by integrating the speed in relation to time. This distance can be calculated during the travel. Alternatively, distance d is measured during the travel. The distance is also recorded.

Stage 2) Determining at Least One Indicator (IND)

According to the invention, a first quantitative indicator corresponding to the optimal speed of the vehicle, $V_{opt}$, which minimizes the energy consumed by the vehicle during the travel, is determined. According to an embodiment of the invention illustrated in FIG. 2, a second qualitative indicator is determined from the optimal energy.

Determining the First Indicator ($V_{opt}$)

Optimal speed $V_{opt}$ is determined by defining an optimal speed for each segment to abide by the initial, final and average speeds, and the distance of the segment traveled. The initial and final speeds of each segment are the speeds at the breakpoints. The average speed and the distance traveled are determined by the measured instant speed. By taking these data into account, the optimal speed is conditioned by the travel achieved and therefore by the external conditions that imposed a speed on the vehicle.

According to an embodiment of the invention, determining optimal speed $V_{opt}$ first determines the breakpoints of the travel for which the travel speed has been adapted (by the driver), notably for road signs: roundabouts, right of way, etc., a traffic condition: roadworks, braking of the vehicle in front, a traffic jam, etc., and/or for the geographical configuration of the road: bends, hills, etc. These breakpoints are thus essentially the slowing down of the vehicle. It is therefore possible to determine the breakpoints by determining stops or local speed minima during a travel. For example, the reversal points of the vehicle speed can be detected, that is the points where the derivative of speed changes sign (it was negative and it becomes positive). It is also possible to identify the breakpoints by a geolocation device of GPS type that can list the road signs, the road configuration and the traffic. The vehicle can therefore be located on a map (road map) with respect to obstacles that are present (crossroads, traffic lights, etc.). Furthermore, it is possible to identify the breakpoints according to the state of the braking system of the vehicle. It may also be considered, in the case of vehicles with communications, identifying these breakpoints by communications established between the vehicle and the vehicles in its immediate surroundings, or communications established between the vehicle and the traffic lights. An imposed speed is thus defined for each breakpoint, which is an initial speed and/or a final speed for calculation of the optimal speed.

Optimal speed $V_{opt}$ is then determined for each segment by an optimization algorithm that determines the speed minimizing the energy consumption, the algorithm being constrained by the speeds at the breakpoints (initial and final speed), by the average speed and by the distance of the segment. The optimization algorithm determines an optimal speed for each segment by passing through the previously identified breakpoints. Indeed, the breakpoints define the initial speed and the final speed of each segment, the measured speed allows an average speed to be determined on the segment. The algorithm enables determination of an optimal speed for each segment with the same distance, for the same duration (or same average speed) with a known initial speed and final speed. Thus, the optimal speed calculation accounts for the external constraints independent of the driving mode. The resulting eco-driving indicator is thus well suited to the current travel. For the optimization algorithm, it is possible to use calculations that have been carried out off-line and stored, such an algorithm example can be dynamic programming executed on a computer (an algorithm technique for optimizing sums of monotonically increasing functions under constraint that is based on a simple principle: any optimal solution is itself based on subproblems solved locally in an optimal way). It is also possible to use on-line calculations, for example by a Hamiltonian approach (using the Hamiltonian mathematical operator), or the optimization problem can be solved analytically from a simplified model implemented in a program executed on a computer of the vehicle. This optimization algorithm can also take account of the speed limits using information transmitted by a geolocation device.

FIG. 3 illustrates the optimal speed $V_{opt}$ calculated for the measured speed $V_{mes}$ represented for a trip example comprising two travels, the first travel being made up of two segments. It is check if the breakpoint is common to the two curves. It can be noted that eco-driving requires in this case higher acceleration upon starting and lower deceleration before stopping in relation to the trip achieved.

This first eco-driving indicator is a quantitative indicator.

Determining a Second Indicator

Figure 2:
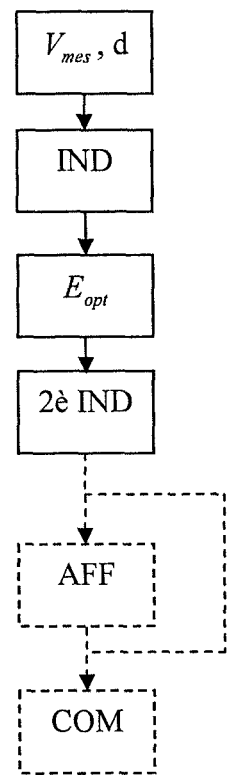
FIG. 2 shows the stages of an embodiment of the method according to the invention.

According to a preferred embodiment of the invention, a second eco-driving indicator is determined. This embodiment is illustrated in FIG. 2. In addition to the stages described above, the optimal energy ($E_{opt}$) is also calculated and the second indicator (2è IND) is deduced therefrom.

Calculating the Optimal Energy ($E_{opt}$)

This stage allows calculation of the energy consumption according to optimal speed $V_{opt}$. This calculation is carried out using a vehicle propulsion model from the previously calculated optimal speed $V_{opt}$.

A vehicle propulsion model is understood to be a model that relates the energy consumed by the vehicle to the speed of the vehicle. This model accounts for the vehicle dynamics and it can notably involve the vehicle engine type (thermal, electric or hybrid), the transmission, the dimensions of the wheels and the mass of the vehicle.

According to an embodiment of the invention, to construct the vehicle propulsion model which is implemented in a program executed on a computer, it is possible to write the equation of the vehicle dynamics on the longitudinal axis thereof (application of the fundamental principle of dynamics to the vehicle):

$$M \frac{dv}{dt} = F_T - F_{res} - F_{slope} - F_{brk}$$

with

M is the total mass of the vehicle;
v is the speed of the vehicle;
$F_T$ is the propulsive force linked with the engine type;
$F_{res}$ is the resistive force comprising the dynamic friction and the rolling friction;
$F_{slope}$ is the force generated by gravity; and
$F_{brk}$ is the mechanical braking force.

$F_{res}$ can be expressed as a function of speed as follows: $F_{res}=a+bv+cv^2$ with a, b, c parameters of the vehicle to be identified (one identification per vehicle is sufficient).

$F_{slope}$ can be expressed as a function of the mass of the vehicle and of the inclination a of the road: $F_{slope}=Mg\sin(\alpha)$.

By writing an equality of torques for the wheels between the wheel rotation torque and the torque provided by the engine, an expression can be formulated for propulsive force $F_T$: $F_T R_{tyre}=T_{mot}r_1\eta_{trans}$ with $R_{tyre}$ being the radius of the wheels, $T_{mot}$ being the torque provided by the engine, r, being the engine to wheel transmission ratio and $\eta_{trans}$ being the transmission efficiency. These equations enable writing a formula relating output torque $T_{mot}$ to speed v of the vehicle, and which depends on other known or determinable parameters.

It is possible to determine the energy consumed as a function of engine torque $T_{mot}$ using maps, charts or equations for modeling the propulsion system implemented in a program executed on a computer. For example, for an electric motor, the torque can be conventionally expressed as a function of the electric current, then the consumed energy can be deduced therefrom. A relation between the consumed energy and the vehicle speed is thus obtained. It is this relation that is referred to as vehicle propulsion model.

Determining a Second Eco-Driving Indicator (2è IND)

The second eco-driving indicator represents a comparison between the optimum consumed energy $E_{opt}$ and the consumed energy $E_{cons}$. The consumed energy $E_{cons}$ can be either directly measured or calculated. Measurement of the consumed energy can be based on the state of charge of the electric battery for an electric vehicle. As for calculation, it can correspond to the use of the aforementioned vehicle propulsion model with the measured speed $V_{mes}$ of the vehicle.

The consumed energy is determined for each travel and it is also recorded. Advantageously, a recording table is formed, wherein the measured speed $V_{mes}$, the optimal speed $V_{opt}$ and the consumed energy $E_{cons}$ are stored. Recording can be periodic at a frequency of 1 Hz.

One or more indicators are determined during this stage. Determining several indicators enables to have several data allowing better driving analysis, for example data relative to both the eco-driving percentage and the amount of energy that can be saved.

According to a first variant, eco-driving indicator IND can be calculated as the ratio of the optimal energy $E_{opt}$ to the consumed energy:

$$E_{cons}: IND = \frac{E_{cons} - E_{opt}}{E_{cons}}.$$

This indicator allows to express as a percentage or a mark the ecological character of the driving.

According to a second variant, eco-driving indicator IND can be calculated as the difference between the optimal energy $E_{opt}$ and the consumed energy $E_{cons}$: IND=$E_{cons}$−$E_{opt}$. This indicator allows quantifying the consumed energy that could be saved through eco-driving.

According to a third variant, eco-driving indicator IND can be calculated as the difference between the optimal energy $E_{opt}$ and the consumed energy $E_{cons}$, divided by the consumed energy $$E_{cons}: IND = \frac{E_{cons} - E_{opt}}{E_{cons}}.$$

This indicator allows quantifying in a percentage of the consumed energy that could be saved through eco-driving in relation to the driving achieved.

Other eco-driving indicators can be formed without departing from the scope of the invention.

The second indicator thus is a quantitative indicator.

Advantageously, the indicators are determined during a travel or at the end of each travel.

Stage 3) Indicator Display (AFF)

It should be noted that this stage is optional and it is a preferred embodiment of the invention.

Once the eco-driving indicator(s) are determined, this information can be transmitted to the driver through a display. This display can be on board the vehicle such as on the dashboard, a stand-alone portable device such as a geolocation device (of GPS type), a mobile phone (of smartphone type). It is also possible to display this indicator on a website that the driver can consult after driving.

The second indicator can be displayed as a mark or a percentage, by a light signal have a color varying according to the value of the indicator. For example, if the indicator of the first variant:

$$IND = \frac{E_{opt}}{E_{cons}}$$

is used, this ratio can be converted to a mark out of 10. A high mark then expresses an ecological driving mode, unlike a low mark.

Furthermore, it is also possible to display the curves of the measured speed $V_{mes}$ and of the optimal speed $V_{opt}$. Thus, the driver can compare the speed of the travel with an eco-driving speed, and by analyzing these curves, the driver can determine the improvements in his or her driving in order to reach an ecological driving mode.

In order not to disturb the driver while driving, this information (indicator(s) and curves) can be displayed at the end of a travel, that is only when the vehicle is stationary.

Stage 4) Vehicle Control (COM)

It should be noted that this stage is optional and it relates to a preferred embodiment of the invention. This stage is independent of indicator display stage 3).

Once the eco-driving indicator(s) is determined, the vehicle can be controlled to optimize its driving from an ecological point of view. This vehicle control modification can, on the one hand, adapt the driver's behavior according to the information displayed, or on the other hand, it can be an automatic control of the vehicle according to the indicators. The propulsion systems are controlled to respect eco-driving, for example by imposing the speed of the vehicle.

According to an embodiment of the invention, at least one eco-driving indicator is determined in the same way for a trip. It should be noted that a trip is made up of multiple travels and corresponds to motion of the vehicle between the starting and the complete stopping of the vehicle. The trip eco-driving indicator is recalculated and it can be displayed at the end of each travel.

FIG. 3 illustrates the information displayed according to an embodiment of the invention. This figure shows, in the upper part thereof, the speed curve as a function of time for the trip already illustrated in FIG. 2 and, in the lower part, AFF indicates the information displayed at the end of each travel. This information contains the measured speed curve, the optimal speed curve, the second eco-driving indicator for the trip IND(C) and the second eco-driving indicator for the last travel IND(B). These eco-driving indicators are those calculated according to the first variant and they are expressed as a mark out of 10.

The method according to the invention can be used for motor vehicles, notably hybrid or electric vehicles. It can however be used in the field of road transport, in the railway field, in the naval sector, in the aviation sector and in the hovercraft sector.

Variant Embodiment

In a variant, the eco-driving indicator can be an eco-driving tip. The same stages as described above can be used with a priori hypotheses on the future speeds in order to calculate a tip that is determined and that can be displayed any time. When the stages are identical to those of the procedure described above, FIG. 1 remains valid. The difference essentially lies in the calculation of the optimal speed, which is calculated using the measured speeds as well as estimated future speeds. Estimation of these speeds can be performed by maps and statistics (according to prior trips or to future circulation constraints).

According to an embodiment of the invention, the past and future breakpoints are first determined. Determination of the past breakpoints is similar to the procedure described in stage 2). On the other hand, for determination of the future breakpoints which are the points where the speed could be imposed are determined according to the travel of the vehicle. The road signs, the traffic and the geographical configuration of the road are for example determined using a geolocation device. These breakpoints can be determined using the statistics of prior trips. Another possibility is vehicles having communication which make it possible to use the capacities of the vehicle to communicate with the nearby vehicles and with the road signs so as to predict future slowing down.

An optimization algorithm, as described above, is then applied. An optimal speed is deduced therefrom, notably for the current point.

An optimal energy is then determined as above.

Finally, an indicator is determined in form of a tip according to the optimal energy and the consumed energy. This tip can be vehicle acceleration or deceleration advice. It can be displayed and/or serve for controlling the vehicle.

The invention claimed is:

1. A method of determining at least one eco-driving indicator of travel of a vehicle, the travel corresponding to motion of the vehicle between two successive stops of the vehicle, comprising:
   a) measuring an instantaneous speed of the vehicle during the travel;
   b) identifying at least one breakpoint of the travel with each breakpoint being associated with a travel constraint where the instant speed has been modified according to conditions external to the travel;
   c) dividing the travel into at least one segment with each segment being defined between two successive breakpoints and determining for each segment a distance and an average speed of the segment by the measured instant speed; and
   d) determining, as a first eco-driving indicator, an optimal speed of the travel, the optimal speed being calculated for each segment by an optimization algorithm implemented in a program executed on a computer that determines a speed minimizing energy consumption of the vehicle with the algorithm being constrained by the measured instant speed at the breakpoints, by the distance and by the average speed of the segment.

2. A method as claimed in claim 1, wherein the driving of the vehicle is in accordance with the first eco-driving indicator.

3. A method as claimed in claim 1, wherein the at least one breakpoint is identified by determining at least one slowing down of the vehicle from at least one of the measured instant speed, a reversal point of the instant speed of the vehicle, a stopping of the vehicle and seeing a road sign, a traffic condition and a road configuration that requires adapting the speed of the vehicle.

4. A method as claimed in claim 2, wherein the at least one breakpoint is identified by determining at least one slowing down of the vehicle from at least one of the measured instant speed, a reversal point of the instant speed of the vehicle, a stopping of the vehicle and seeing a road sign, a traffic condition and a road configuration that requires adapting the speed of the vehicle.

5. A method as claimed in claim 1, wherein a next breakpoint is identified using maps and statistics relative to previous trips and at least one of a road sign, a traffic condition and a road configuration.

6. A method as claimed in claim 3, wherein the at least one breakpoint is identified by at least one of a geolocation device of the vehicle and a condition of the braking system of the vehicle.

7. A method as claimed in claim 5, wherein the at least one breakpoint is identified by at least one of a geolocation device of the vehicle and a condition of the braking system of the vehicle.

8. A method as claimed in claim 1, wherein the optimization algorithm is a dynamic programming algorithm or a Hamiltonian method.

9. A method as claimed in claim 2, wherein the optimization algorithm is constrained by a maximum allowable speed.

10. A method as claimed in claim 1, wherein a second eco-driving indicator is determined by:
    e) calculating an optimal energy as a function of the optimal speed by using a propulsion model of the vehicle that relates energy consumed by the vehicle to speed of the vehicle; and
    f) determining the second eco-driving indicator by the optimal energy and of the energy consumed during the travel with the consumed energy being measured or calculated from the measured speed and the vehicle propulsion model.

11. A method as claimed in claim 10, wherein the second eco-driving indicator is calculated during the travel.

12. A method as claimed in claim 10, wherein the second eco-driving indicator is a mark proportional to a ratio of the optimal energy to the consumed energy.

13. A method as claimed in claim 11, wherein the second eco-driving indicator is a mark proportional to a ratio of the optimal energy to the consumed energy.

14. A method as claimed in claim 10, wherein the vehicle propulsion model is constructed from an equation on a longitudinal axis of the vehicle of the fundamental principle of dynamics applied to the vehicle with the model depending on powertrain transmission dimensions of the wheels and mass of the vehicle.

15. A method as claimed in claim 11, wherein the vehicle propulsion model is constructed from an equation on a longitudinal axis of the vehicle of the fundamental principle of dynamics applied to the vehicle with the model depending on powertrain transmission dimensions of the wheels and mass of the vehicle.

16. A method as claimed in claim 12, wherein the vehicle propulsion model is constructed from an equation on a longitudinal axis of the vehicle of the fundamental principle of dynamics applied to the vehicle with the model depending on powertrain transmission dimensions of the wheels and mass of the vehicle.

17. A method as claimed in claim 10, wherein the vehicle is an electric motor vehicle powered by a battery and consumed energy depends on a state of charge of the battery.

18. A method as claimed in claim 11, wherein the vehicle is an electric motor vehicle powered by a battery and consumed energy depends on a state of charge of the battery.

19. A method as claimed in claim 12, wherein the vehicle is an electric motor vehicle powered by a battery and consumed energy depends on a state of charge of the battery.

20. A method as claimed in claim 1, wherein the at least one eco-driving indicator is displayed at an end of each travel.

21. A method as claimed in claim 20, wherein the at least one indicator is displayed on one of a dashboard of the vehicle, on a website, a stand-alone portable device or a mobile phone.

22. A method as claimed in claim 5, wherein a second eco-driving indicator is at least one of a vehicle acceleration and a deceleration.

23. A method as claimed in claim 6, wherein a second eco-driving indicator is at least one of a vehicle acceleration and a deceleration.

24. A method as claimed in claim 8, wherein a second eco-driving indicator is at least one of a vehicle acceleration and a deceleration.

25. A method as claimed in claim 9, wherein a second eco-driving indicator is at least one of a vehicle acceleration and a deceleration.

26. A method as claimed in claim 10, wherein the second eco-driving indicator is at least one of a vehicle acceleration and a deceleration.

27. A method as claimed in claim 1, wherein stages a) to d) are repeated for multiple travels forming a trip and the at least one eco-driving indicator is determined for the trip.

28. A vehicle control method for determining at least one eco-driving indicator by travel of a vehicle, the travel corresponding to motion of the vehicle between two successive stops of the vehicle, the method comprising:
 a) measuring an instantaneous speed of the vehicle during the travel;
 b) identifying at least one breakpoint of the travel with each breakpoint being associated with a travel constraint where the instant speed has been modified according to conditions external to the travel;
 c) dividing the travel into at least one segment with each segment being defined between two successive breakpoints, and determining for each segment a distance and an average speed of the segment by the measured instant speed; and
 d) determining, as the first eco-driving indicator, an optimal speed of the travel, the optimal speed being calculated for each segment by an optimization algorithm implemented in a program executed on a computer that determines a speed minimizing energy consumption of the vehicle with the algorithm being constrained by the measured instant speed at the breakpoints, by the distance and by the average speed of the segment; and
 adapting driving of the vehicle according to the at least one eco-driving indicator.

29. A computer program product stored on a non-transitory computer readable medium comprising program instructions for execution on a processor a method of travel of a vehicle with the travel corresponding to motion of the vehicle between two successive stops of the vehicle, comprising:
 a) measuring an instantaneous speed of the vehicle during the travel;
 b) identifying at least one breakpoint of the travel with each breakpoint being associated with a travel constraint where the instant speed has been modified according to conditions external to the travel;
 c) dividing the travel into at least one segment with each segment being defined between two successive breakpoints, and determining for each segment a distance and an average speed of the segment by the measured instant speed; and
 d) determining, as the first eco-driving indicator, an optimal speed of the travel, the optimal speed being calculated for each segment by an optimization algorithm implemented in a program executed on a computer that determines a speed minimizing energy consumption of the vehicle with the algorithm being constrained by the measured instant speed at the breakpoints, by the distance and by the average speed of the segment.

30. A method as claimed in claim 28, wherein a second eco-driving indicator is determined by:
 e) calculating an optimal energy as a function of the optimal speed by using a propulsion model of the vehicle that relates energy consumed by the vehicle to speed of the vehicle; and
 f) determining the second eco-driving indicator by the optimal energy and of the energy consumed during the travel with the consumed energy being measured or calculated from the measured speed and the vehicle propulsion model.

31. A method as claimed in claim 30, wherein the second eco-driving indicator is calculated during the travel.

32. A method as claimed in claim 30, wherein the second eco-driving indicator is a mark proportional to a ratio of the optimal energy to the consumed energy.

33. A method as claimed in claim 31, wherein the second eco-driving indicator is a mark proportional to a ratio of the optimal energy to the consumed energy.

34. A method as claimed in claim 30, wherein the vehicle propulsion model is constructed from an equation on a longitudinal axis of the vehicle of the fundamental principle of dynamics applied to the vehicle with the model depending on powertrain transmission dimensions of the wheels and mass of the vehicle.

35. A method as claimed in claim 29, wherein a second eco-driving indicator is determined by:
 e) calculating an optimal energy as a function of the optimal speed by using a propulsion model of the vehicle that relates energy consumed by the vehicle to speed of the vehicle; and
 f) determining the second eco-driving indicator by the optimal energy and of the energy consumed during the travel with the consumed energy being measured or calculated from the measured speed and the vehicle propulsion model.

36. A method as claimed in claim 35, wherein the second eco-driving indicator is calculated during the travel.

37. A method as claimed in claim 35, wherein the second eco-driving indicator is a mark proportional to a ratio of the optimal energy to the consumed energy.

38. A method as claimed in claim 36, wherein the second eco-driving indicator is a mark proportional to a ratio of the optimal energy to the consumed energy.

39. A method as claimed in claim 35, wherein the vehicle propulsion model is constructed from an equation on a longitudinal axis of the vehicle of the fundamental principle of dynamics applied to the vehicle with the model depending on powertrain transmission dimensions of the wheels and mass of the vehicle.

* * * * *